United States Patent [19]

Grimm

[11] Patent Number: 5,029,689
[45] Date of Patent: Jul. 9, 1991

[54] SPRING CLUTCH ASSEMBLY FOR USE IN A TRANSMISSION

[75] Inventor: Duane H. Grimm, Rockford, Ill.

[73] Assignee: Sundstrand Corporation, Rockford, Ill.

[21] Appl. No.: 580,156

[22] Filed: Sep. 10, 1990

[51] Int. Cl.⁵ ............................................. F16D 11/06
[52] U.S. Cl. ................................. 192/41 S; 192/48.92; 192/81 C
[58] Field of Search ................. 192/41 S, 81 C, 47, 192/48.92, 12 BA, 48.1; 74/372

[56] References Cited

U.S. PATENT DOCUMENTS

| | | | |
|---|---|---|---|
| 2,009,964 | 7/1935 | Mottlau | 192/41 S |
| 2,274,873 | 3/1942 | Starkey | 192/37 |
| 2,673,730 | 3/1954 | Hupp | 192/41 S |
| 3,149,705 | 9/1964 | Shoquist | 192/81 C |
| 3,637,056 | 1/1972 | Baer | 192/12 BA |
| 3,684,068 | 8/1972 | Ford | 192/84 T |
| 3,915,268 | 10/1975 | MacDonald | 192/12 BA |
| 3,966,024 | 6/1976 | Baer | 192/12 BA X |
| 4,189,040 | 2/1980 | Braunschweig | 192/26 |
| 4,330,054 | 5/1982 | MacDonald | 192/41 S X |
| 4,418,811 | 12/1983 | MacDonald | 192/81 C |
| 4,440,280 | 4/1984 | Hagihara | 192/36 |

*Primary Examiner*—Allan D. Herrmann
*Assistant Examiner*—Andrea Pitts
*Attorney, Agent, or Firm*—Wood, Phillips, Mason, Recktenwald & VanSanten

[57] ABSTRACT

Difficulties in positively engaging and disengaging helical spring clutch mechanisms are avoided in a construction including a driven shaft (10) with a gear (18) rotatably mounted on the shaft (10). A helical spring (40) is disposed about part (24) of the gear (18) and the driving shaft (12) and a reaction collar (28) is located adjacent to the spring (40) and is splined to the driving shaft (12). A friction collar (52) is engagable with the helical spring (28) and is carried by the driving shaft (10). Ball actuators (62, 64) are provided for selectively engaging the friction collar (52) with the helical spring (40) thereby causing the spring (40) to engage the reaction collar (28) and rotate with the driving shaft (12) to drive the gear (18).

12 Claims, 2 Drawing Sheets

SPRING CLUTCH ASSEMBLY FOR USE IN A TRANSMISSIONr

FIELD OF THE INVENTION

This invention relates at a mechanical clutch, and more particularly to one that may be employed in, for example, a transmission to selectively engage a driving rotatable element with a rotatable element to be driven in such a way as to minimize shock loading of the components during engagement of the clutch.

BACKGROUND ON THE INVENTION

Mechanisms for coupling a driving shaft with rotatable elements to be driven are commonly known and exist in many forms. One large group of such coupling elements comprises mechanical clutches and of the field of clutches, one known configuration includes the use of a helical spring having one end secured to either the driving or driven element and the other end free and disposed about the other element to which the first is to be selectively coupled. Frictional engagement of the free end of the spring, typically in the direction in which the end of the helical spring is pointing, with a relatively rotatable one of the elements tends to carry that end with the element about which it is wrapped with the consequence that the helical spring tends to be wrapped tighter causing a decrease in its diameter which in turn tends to shrink the same into engagement with the rotary element about which it is wrapped to tightly grasp the same and transmit rotary motion. In some cases, the same effect may be achieved by causing radial expansion of the spring to engage a radially outer element within which the spring is disposed. In general terms, U.S. Pat. No. 4,440,280, issued on Apr. 3, 1984 to Hagihara is illustrative of such a device in a variety of forms.

Most frequently, clutches of this type are utilized as one way clutches That is, such clutches are utilized to transmit rotary motion to the driven member upon one direction of rotation of the driving member but not the other. Because of this type of usage, they have not been employed to any great degree in variable ratio transmission system where a certain attribute of such clutches could be highly advantageous. For example, clutches of this sort engage with a minimum of shock loading which in turn minimizes the fatiguing of various components of a clutch mechanism.

The present invention is, therefore, directed to providing a unique spring clutch mechanism that may be advantageously employed in variable ratio transmissions to take advantage of the low shock loading that occurs during engagement of such clutches and which may be readily controlled in terms of engagement and disengagement so as to allow disengagement for either direction of rotation of the driving shaft.

SUMMARY OF THE INVENTION

It is a principle object of the invention to provide a new and improved spring clutch assembly. It is also an object of the invention to provide a variable ratio transmission incorporating such a clutch.

An exemplary embodiment of the invention achieves the foregoing object in a helical spring clutch mechanism including a driving shaft, a driven rotary element mounted concentrically about the driving shaft, and a helical spring disposed about part of the rotary element and the driving shaft. Retention means are located on the rotary element for coupling engagement with one end of the helical spring and a reaction element is located adjacent the helical spring and is connected to the driving shaft. A friction collar is engagable with the helical spring and is carried by the driving shaft. Actuation means are provided for selectively engaging the friction collar with the helical spring, thereby causing the spring to engage with the reaction element and rotate with the driving shaft.

In one embodiment of the invention, the retention means on the rotary element is adapted to allow non-fixed engagement with the helical spring. In such an embodiment, the retention means may be a notch adapted to freely receive an end of the helical spring.

The invention contemplates that the friction collar be flexible so that frictional engagement of the friction collar with the helical spring is effectuated through radial displacement of at least part of the friction collar.

In one embodiment of the invention, the friction collar is disposed and located axially between an inner hub of the rotary element and the reaction collar and the rotary element may be a gear.

The invention also contemplates that an annular recess be located between the inner hub and an outer part of the driven gear such that an interior part of the reaction collar is disposed within the annular recess. The friction collar is adapted to be expanded in the radial direction to engage the spring from the inner side thereof.

In a highly preferred embodiment, the friction collar and the helical spring are radially spaced such that the friction collar is engagable with the helical spring and actuation thereof is accomplished by means of an axial by movable shift shaft disposed within the driving shaft. The shift shaft includes an axially extending recess along an outer surface thereof. An aperture is located in the driving shaft and is alignable with the friction collar. A ball is movably retained between the friction collar and the driving shaft and in the groove within the shift shaft so that in a disengaged mode of operation, the recess is aligned with the aperture such that the ball is receivable in the aperture and is movable radially away from the friction collar so that the friction collar does not engage the helical spring. In the engaged mode of operation, the recess is not aligned with the aperture such that the ball is urged radially outward and against the flexible friction collar causing the friction collar to engage the helical spring.

The clutch mechanism is ideally suited for use in a transmission of the variable ratio sort The plurality of rotary elements such as gears are mounted in axially spaced relation about the rotary shaft and a helical spring is employed for each rotary element along with retention means on each rotary element. Also included are a plurality of reaction collars and a plurality of the friction collars, one for each of the rotary elements. In this embodiment, the driving shaft has apertures for each of the friction collars and the shift shaft is provided with groves or recesses that are oriented so as to cause sequential engagement of a ball with the corresponding friction collar to engage the corresponding rotary element. Where the rotary elements are gears, they may have different pitch diameters to provide a number of different gear ratios corresponding to the number of gears.

DESCRIPTION OF THE PREFERRED EMBODIMENT

An exemplary embodiment of a clutch made according to the invention is illustrated in FIGS. 1-4 inclusive and will be described herein in connection with a variable ratio transmission. However, it should be understood that the clutch of the invention may be used with efficacy in any of those instances where a unidirectional clutch may be desired and where provision for positive actuation is necessary or desired.

Figure 1:
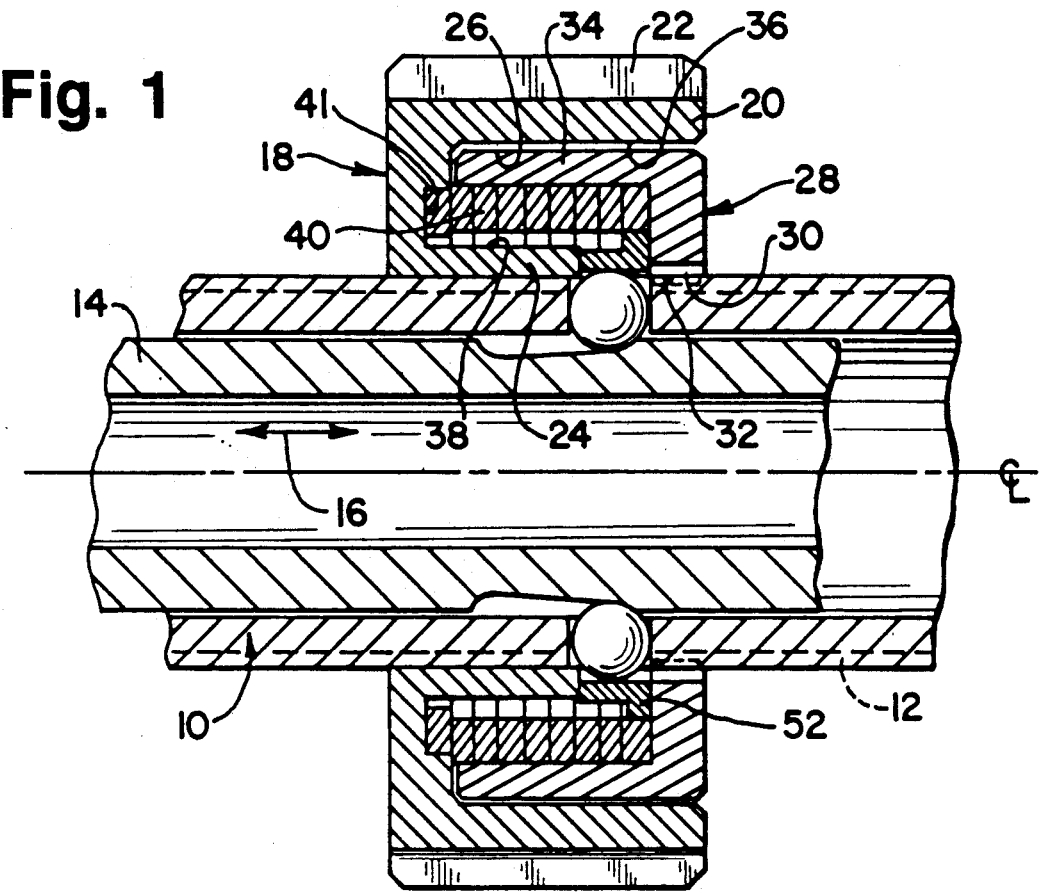
FIG. 1 a sectional view of a spring clutch made according to the invention in an engaged configuration.

Referring to FIG. 1, the clutch assembly includes a driving shaft, generally designated 10, provided with an external spline 12. The driving shaft 10 is hollow and disposed therein is an actuating shaft 14. When used in a transmission, the actuating shaft 14 may also be termed a "shift shaft" as is the same is employed to shift the transmission from one ration to another as will be seen.

The actuating shaft 14 is axially movable in the direction of an arrow 16 within the driving shaft 10.

A rotary element in the form of a gear, generally designated 18, is freely rotatable on the driving shaft 10. The gear includes a radially outer annular section 20 provided with the customary gear teeth 22 and a radially inner hub 24. An annular recess 26 that opens axially to the right a viewed in FIG. 1 is located between the outer section 20 and the hub 24.

A somewhat cup shaped reaction collar, generally designated 28, includes a central opening 30 provided with splines 32 that are engaged with the splines 12 on the exterior of the driving shaft 10. Thus, the reaction collar 28 is positively driven by the driving shaft 10.

Figure 2:
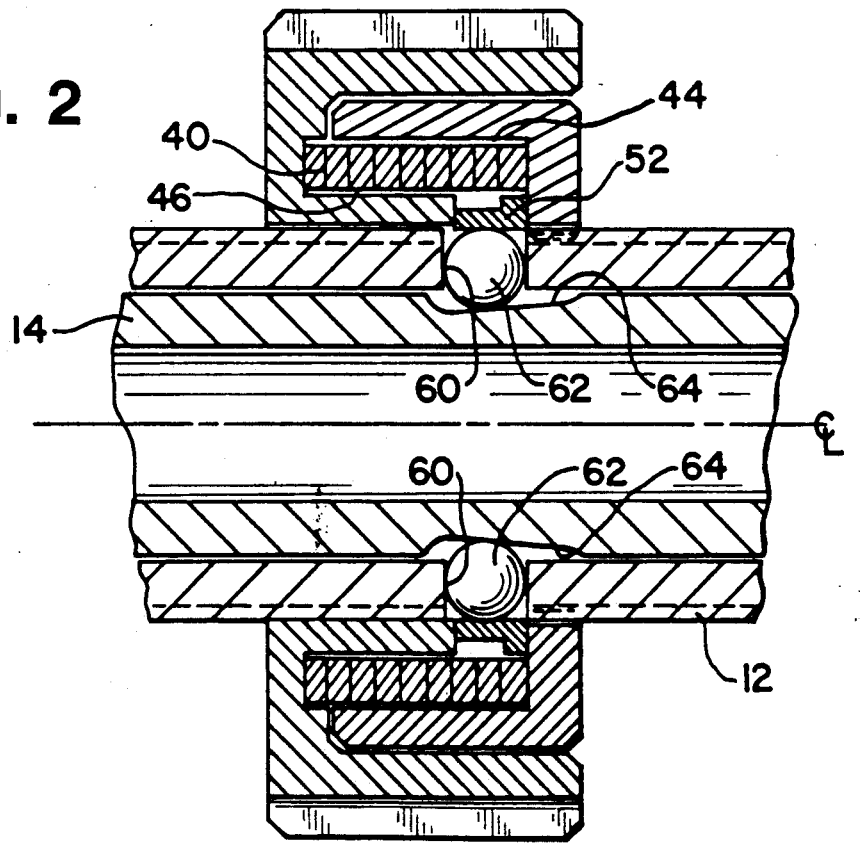
FIG. 2 a view similar to FIG. 1 but showing the clutch in a disengaged configuration.

The reaction collar 28 includes an annular, axially directed flange 34 that extends into the recess 26 and preferably as located much closer to the radially outer wall 36 thereof than to the radially inner wall 38 which is defined by the radially outer surface of the hub 24. Disposed within the resulting annular cavity is a helically wound spring 40. The spring 40 may be constructed so as to be slightly spaced from the interior surface of the flange 34 as illustrated in FIG. 2, with such a space being designated 44 when the clutch is disengaged. A similar space 46 will also exist between the interior of the spring 40 and the hub 24.

Figure 3:
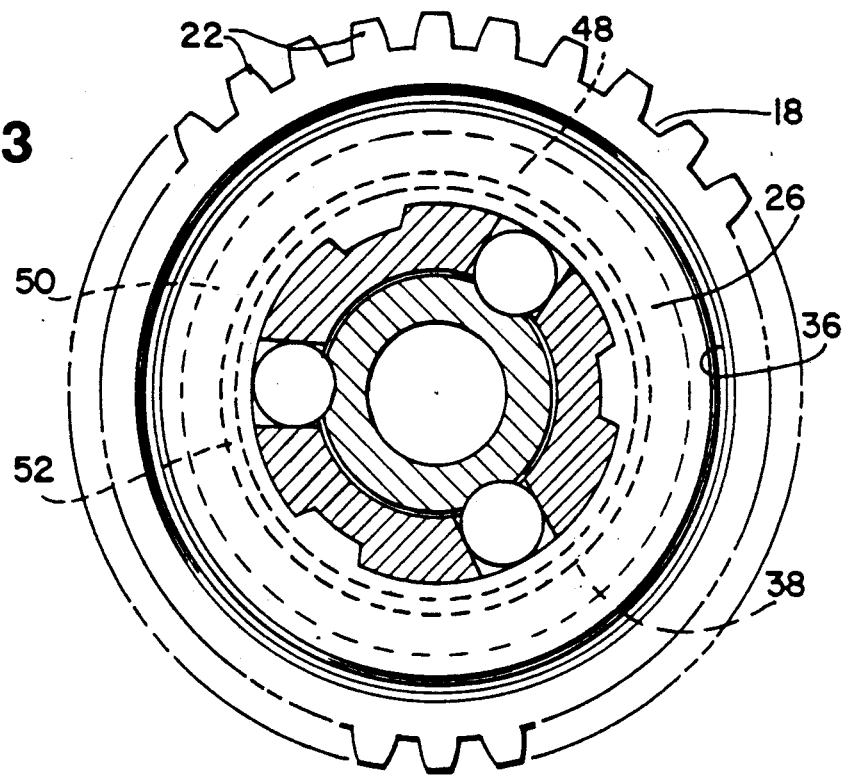
FIG. 3 is a sectional view of a rotary element intended to be driven a in the form of a gear that may be employed in the invention.

As seen in FIG. 3, an arcuate, ever deepening recess 48 terminating in a squared off end 50 is formed in the bottom 52 of the recess 26. The recess 48 is adapted to receive an end of the spring 40 with its end butting against the end 50 of the recess 48. Thus, it will be appreciated that, in relation to FIG. 3, that if the spring 40 is being driven in a counterclockwise direction, the abutment of an end thereof against the end 50 of the groove 48 will result in the gear 18 being driven in a counterclockwise direction. Thus, the groove 48 serves to couple the spring to the gear 18 for counterclockwise movement in the example just described.

The hub 24 and the reaction collar 28, just radially outward of the exterior of the driving shaft 10, are axially spaced as viewed in FIGS. 1 and 2 and a flexible friction collar 52 of annular configuration is disposed about the driving shaft 10 and located between the hub 24 and the reaction collar 28. The friction collar 52 will be nominally circular but because of its flexibility, by radially outward urging of the same, it may be moved radially outward and into engagement with the end of the spring 40 opposite that which is received within in the groove 48. When that occurs, the free end of the spring 40 will be urged radially outward and will ultimately frictionally engage the radially inner surface of the flange 34 which in turn will be rotating. If the direction of rotation is such as to cause the spring 40 to unwind, the frictional engagement between the reaction collar 20 and the spring 40 will have exactly that effect causing the diameter of the spring to enlarge. As a consequence, the outer diameter of the spring 40 will cross and close the gap 44 shown in FIG. 2 and move into tight frictional engagement with the reaction collar 28. As a consequence, the spring will move with the reaction collar 28 and the resulting rotation in turn will be provided to the gear 18 by reason of the abutment of the end of the spring 40 against the end 50 of the groove 48.

If the friction collar 52 is permitted to move radially inwardly to return to the position illustrated in FIG. 2, depending upon the frictional loading on the exterior of the spring 40, the same may return to the position illustrated in FIG. 2 to disengage the clutch. By suitably matching the spring constant of the spring 40 with the maximum load in the system, desired torque transmission needs as well as the ability to allow such disengagement can be achieved For the purpose of moving the friction collar 52 to a position to engage the free end 50 of the spring 40, at diametrically opposite locations (or equally angularly spaced locations if desired,) the driving shaft 12 is provided with apertures 60. Within each of the apertures 60 is a ball 62. Alignable with each of the apertures 60 is a recess 64 in the actuator shaft 14. As illustrated, the recesses 64 have canted bottoms, being deeper on their left sides than on their right. As a consequence, movement of the actuator shaft 14 from the position illustrated in FIG. 2 to that illustrated in FIG. 1, that is, to the left, will result in the balls 62 being cammed in the radially outer direction to move the friction collar 52 radially outwardly and engage the free end of the spring 60. Rightward movement of the actuator shaft will allow the friction collar to collapse the balls 62 radially inwardly and to a deeper part of the recesses 64 to disengage the clutch.

It should be noted that recesses of uniform depth may be employed if desired, relying on a non-recessed part of the exterior of the actuator shaft 14 to perform the same function as the shallow part of each recess 64.

Figure 4:
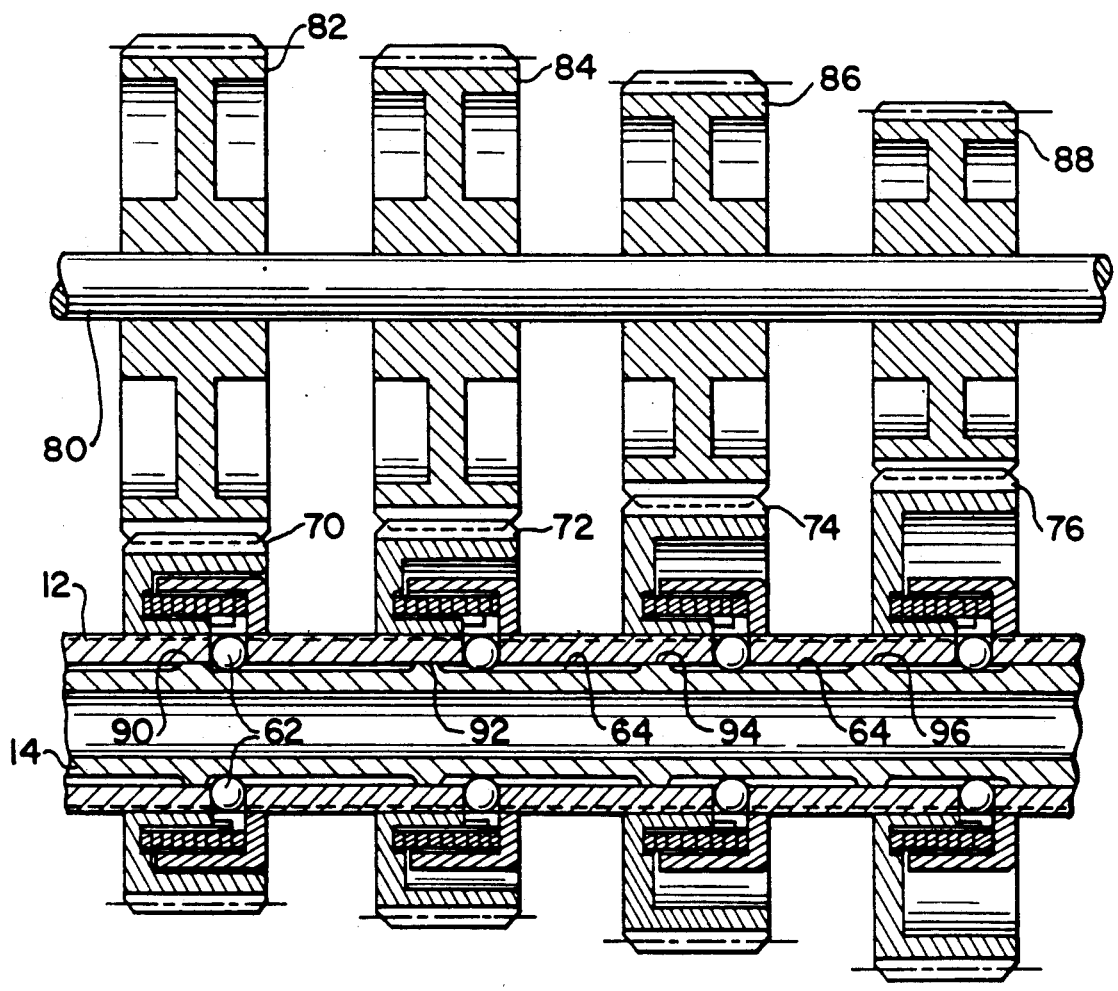
FIG. 4 is partial schematic, partial sectional view of a variable ratio transmission made according to the invention.

Turning now to FIG. 4, a series of four of the clutches are shown mounted on the driving shaft 10. From left to right, one clutch is associated with a relatively small gear 70, another associated with a somewhat larger gear 72, still another associated with a even larger gear 74, and the last associated with a largest gear 76. An output shaft is shown schematically at 80. It includes gears 82, 84, 86 and 88 respectively meshed with the gears 70, 72, 74 and 76.

It will be recognized that if power is being transmitted from the gear 70 to the gear 82, a relatively low gear ratio is being employed. Transversely, if power is being transmitted from the gear 76 to the gear 88, a high gear ratio is being employed The intermediate gears, of course, provide intermediate gear ratios.

To actuate the clutch associated with the gear 70, a land 90 is employed to move the associated ball 62 radially outwardly. To engage the clutch associated with the gear 72, a similar land 92 is employed while a land 94 is employed to engage the clutch associated with the gear 74 and a land 96 employed to engage the clutch associated with the gear 76.

With the actuator shaft 14 or shift shaft in the position illustrated in FIG. 4, none of the clutches are engaged and no power will be transmitted. It will also be observed that upon rightward movement of the shift shaft 14, at first, the land 90 will cause the clutch associated with the gear 70 will be engaged while the clutches associated with the remaining gears 72, 74 and 76 will remain disengaged by reason of the disposition of the respective lands 92, 94 and 96 in relation to the grooves 64 that separate them.

Further movement of the shift shaft 14 to the right will result in the land 92 engaging the clutch associated with the gear 72. In the meantime, the clutches associated with the gears 74 and 76 will remain disengaged and the land 90 associated with the clutch for the gear 70 will have moved past the associated ball 62 so as to allow the clutch for the gear 70 to become disengaged.

Continued movement of the shaft 14 to the right will result in disengagement of the clutch associated with the gear 72 and engagement of the clutch associated with the gear 74 by reason of the operation of the lands 94. Again, the clutch associated with the gear 76 will remain disengaged.

Finally, full movement of the shaft 14 to the right will ultimately engage the clutch associated with the gear 76 while disengaging the clutches associated with the gear 70, 72 and 74.

Because the friction collars 52 essentially act as pilot clutches for the main clutch action provided by the spring 40, and because of the frictional engagement as well as a resilient nature of the components, shock loading during shifting between engaged and disengaged configurations is minimized. And the invention is optimally suited to utilize this advantage in a variable ratio transmission through the novel configuration of the clutch mechanism hereof. Consequently, a highly reliable mechanism is provided.

I claim:
1. A helical spring clutch mechanism comprising
   a driving shaft;
   a driven rotary element mounted concentrically about said driving shaft;
   a helical spring disposed about part of said rotary element and said driving shaft and displaceable radially with respect to said driving shaft;
   retention means on said rotary element for coupling engagement with one end of said helical spring;
   a reaction element adjacent said helical spring to be engageable thereby upon radial displacement of said helical spring and connected to said driving shaft;
   a friction collar enagageable with said helical spring to cause said radial displacement and carried by said driving shaft; and
   actuation means for selectively engaging said friction collar with said helical spring independent of the speed of said driving shaft, thereby causing said spring to engage said reaction element and rotate with said driving shaft.

2. A helical spring clutch mechanism as claimed in wherein said helical spring is disposed in non-fixed engagement with said retention means on said rotary element.

3. A helical spring clutch mechanism as claimed in 1 wherein said friction collar is flexible, such that frictional engagement of said friction collar with said helical spring is effectuated through radial displacement of at least part of said friction collar.

4. A helical spring clutch mechanism comprising
   a driving shaft;
   a driven rotary element in the form of a gear mounted concentrically about said driving shaft, said driven gear having an inner hub and outer teeth;
   a helical spring disposed about and coupled to said inner hub of said driven gear;
   retention means on said driven gear for coupling engagement with one end of said helical spring;
   a reaction collar adjacent said helical spring and connected to said driving shaft;
   a flexible friction collar engagable with said helical spring and carried by said driving shaft; and
   actuation means for selectively engaging said friction collar with said helical spring, thereby causing said spring to engage with said reaction collar and rotate with said driving shaft.

5. A helical spring clutch as claimed in 4 wherein said friction collar is disposed axially between said inner hub of said driven gear and said antecedent reaction collar.

6. A helical spring clutch as claimed in 5 wherein an annular recess said inner hub and said outer teeth of said driven gear define, and wherein an interior part of said reaction collar is disposed within said annular recess and is adjacent said outer teeth.

7. A helical spring clutch as claimed in 6, wherein part of said friction reaction collar is adapted to be expandable in a radial direction.

8. A helical spring clutch as claimed in 7, wherein said friction collar and said helical spring are radially spaced such that said friction collar is engageable with said helical spring upon radial displacement thereof, so that upon relative angular rotation between said driven shaft and said helical spring said helical spring is radially displaced to cause said friction collars to be engaged by said helical spring and wherein said helical spring and said interior part of said reaction collar are radially spaced such that said helical spring is engageable with said interior part upon radial expansion of said helical spring, thereby coupling said rotary element to said reaction collar.

9. A helical spring clutch as claimed in 4, wherein said actuation means comprises an axial shift shaft disposed within said driving shaft, said shift shaft having an axially extending recess along an outer surface thereof, and further comprising an aperture extending through said driving shaft alignable with said friction collar and a ball movably retained between said friction collar and said driving shaft, said recess and said aperture being disposed such that in a disengaged mode of operation said recess is aligned with said aperture, such that said ball carried it receivable in said recess and is movable radially away from said friction collar, so that said friction collar does not engage said helical spring and such that in an engaged mode of operation said recess is not aligned with said aperture so that said ball is urged radially outwardly and against said flexible friction collar causing said friction collar to engage said helical spring.

10. A helical spring clutch mechanism and transmission comprising:

a driving shaft;

a plurality of rotary elements mounted concentrically about said driving shaft in axially spaced relation, each said rotary element having an inner hub adjacent said driving shaft and an outer portion radially spaced from said inner hub, such that an annular recess is defined about one face of said rotary element;

a helical spring disposed within said annular recess of each said rotary element and about the corresponding inner hub and said driving shaft;

retention means on each said rotary element and adjacent said annular recess for coupling engagement with one end of the corresponding helical spring;

a plurality of reaction collars, each adjacent a corresponding one of said helical springs and said connected to said driving shaft;

a plurality flexible friction collars, each engagable with said a corresponding one of said helical springs and carried by said driven shaft; and actuation means for selectively engaging a only a selected one of said friction collars with its corresponding a plurality of axially spaced helical spring, such that the alternate engagement and disengagement of any one of said plurality of rotary elements to said driving shaft may be effectuated.

11. A helical spring clutch as claimed in 10, wherein said actuation means comprises an axial shift shaft disposed within said driving shaft, said shift shaft having a plurality of axially extending recesses along an outer surface thereof, and further comprising a plurality of apertures extending through said driving shaft and selective alignable with a corresponding friction collar in a predetermined sequence, and a ball movably retained in each said operative so that as said shift shaft is moved axially, said balls are independently engaged with said friction collars such that each of said balls is sequentially forced against a corresponding friction collar causing the friction collar to engage the corresponding one of said helical springs.

12. A helical spring clutch as claimed in 11, wherein said apertures and recesses are axially spaced, said axial spacing representing a preferred axial displacement of said shift shaft required to achieve said predetermined sequence of engagement and disengagement with each of said rotary elements.

* * * * *